United States Patent [19]

Spencer

[11] Patent Number: 5,197,002
[45] Date of Patent: Mar. 23, 1993

[54] METHODS AND APPARATUS FOR DYNAMIC HASHING

[75] Inventor: Paul A. Spencer, Highland Park, N.J.

[73] Assignee: Bell Communications Research, Inc., Livingston, N.J.

[21] Appl. No.: 455,264

[22] Filed: Dec. 22, 1989

[51] Int. Cl.$^5$ .................. G06F 15/21; G06F 15/40
[52] U.S. Cl. .................. 364/406; 395/400; 395/425; 395/600
[58] Field of Search ............ 364/401, 406, 408; 395/400, 425, 20, 600

[56] References Cited

U.S. PATENT DOCUMENTS

| 4,370,711 | 1/1983 | Smith | 364/200 |
|---|---|---|---|
| 4,730,348 | 3/1988 | MacCrisken | 375/122 |
| 5,032,987 | 7/1991 | Broder et al. | 364/200 |

OTHER PUBLICATIONS

*Information Systems,* vol. 13, No. 1, Hsiao et al. "Adaptive Hashing", pp. 111–127, (abstract only).
*Avtomatika i Vychislitel'naya Tekhnika,* No. 3, Blank et al. "Adaptive algorithm for an information search", pp. 62–66 (abstract only).
*Standard Dictionary of Computers and Information Processing,* Weik, Hayden Book Company, Inc., 1977, p. 259.
*Kibernetika,* vol. 21, No. 5, Driyanskii et al., "Algorithms for Computing Estimates in Document Retrieval Systems", pp. 708–715 (abstract only).
*Proceedings of Joint BCS and ACM Symposium,* Cambridge Pub., Croft et al., "The use of adaptive mechanisms for selection of search strategies is document retrieval systems", pp. 95–110 (abstract only).
*The Art of Computer Programming* vol. 3, Sorting and Searching pp. 506–549, Addison-Wesley, Reading, Massachusetts, 1973.

*Primary Examiner*—Roy N. Envall, Jr.
*Assistant Examiner*—David Huntley
*Attorney, Agent, or Firm*—Leonard Charles Suchyta; James W. Falk

[57] ABSTRACT

A system is disclosed for processing billing records in a data packet transmission network by optimizing the search algorithm for accessing customer records. Using hashing techniques, the hashing parameters of hashing key and modulus base of the modulo arithmetic are varied to optimize the hashing function for recently received billing records. These optimum parameters are then used predictively to hash the next batch of billing records. In a preferred embodiment, the billing records are queued in two ping-pong memories and the contents of one are used to drive the optimizer while the contents of the other are used to drive the billing procedure.

6 Claims, 5 Drawing Sheets

BILLING PROCEDURE

DATA PACKET NETWORK

BILLING RECORD FORMAT

| SOURCE ADDRESS | DESTINATION ADDRESS | PACKET COUNT |

CUSTOMER ACCOUNT RECORD

| SOURCE ADDRESS | DESTINATION ADDRESS | ACCUMMULATED COUNTS |

BILLING PROCEDURE

PING PONG QUEUE

STATION ADDRESS FORMAT

| COUNTRY CODE (5) | AREA CODE (3) | C.O. PREFIX CODE (3) | STATION CODE (4) | N.A. (1) |

OPTOMIZE HASH FUNCTION

ASSESS HASHING PARAMETERS

METHODS AND APPARATUS FOR DYNAMIC HASHING

TECHNICAL FIELD

This invention relates to information storage and retrieval systems and, more particularly, to dynamically alterable search algorithms for rapidly accessing data records in such systems.

BACKGROUND OF THE INVENTION

Data packet transmission systems have become commonplace, from local area networks to networks which are national or even international in scope. When such data transmission services are provided by a common carrier, it is necessary to bill each customer for the service received by that customer. Moreover, it is highly desirable to provide usage sensitive billing for data transmission services provided over such a common carrier transmission network. Such networks comprise a plurality of geographically dispersed switching nodes connected together so as to provide multipath routes between a much larger plurality of customer stations connected to the closest switching node. One such system is shown in the co-pending application of S. J. Colestani, U.S. Ser. No. 326,027, filed Mar. 20, 1989, and assigned to applicant's assignee now U.S. Pat. No. 5,050,162, issued Sep. 17, 1991.

It is relatively simple to generate a billing message when a transmitted packet arrives at the switching point closest to the receiving station. Since each transmitted packet includes a header with both the source address and the destination address included, these two addresses need only be combined with a packet length (if the packets are variable in size). The two addresses can be used to calculate the length of the route and hence the number of packet message charging units to be applied for that route. This charge unit count is then multiplied by the packet count to obtain the total charging unit count which, in turn, can be multiplied by a per unit charge to obtain the billing amount. For large transmission networks including a large plurality of switching nodes and stations, the number of such billing messages generated in a unit time is extremely large. One serious problem with providing usage sensitive billing for such large networks is the difficulty of processing the billing messages fast enough to avoid backup and loss of some of the messages. A critical bottleneck in such billing processing is the time required to search for and retrieve the proper customer account to be updated by the received billing message.

Information or data stored in a computer controlled storage mechanism can be retrieved by searching for a particular value in the stored records. The record or records with matching values are then retrieved. Such searching techniques require repeated access or probes into the storage mechanism to perform value comparisons. In large storage and retrieval systems requiring frequent accesses, such linear or sequential searching often requires more time than is available for the task.

A well-known and much faster method for storing and retrieving information from computer store involves the use of so-called "hashing" techniques. These techniques are also sometimes called scatter-storage or key-transformation techniques. In a system using hashing, a portion of the data record called a key is operated upon (by a hashing function) to produce a storage address in the assigned storage space (called the hash table). This storage address is then used to access the desired storage location directly with far fewer storage accesses or probes than are required for sequential searching. The storage location at the computed address can contain the data record itself or can contain a pointer to the location of the data record for indirect addressing. The fundamentals of hashing techniques are described in the classic text by D. Knuth entitled *The Art of Computer Programming, Volume 3, Sorting and Searching*, pages 506-549, Addison-Wesley, Reading, Mass., 1973.

Hashing functions are designed to translate the universe of key values into addresses uniformly distributed throughout the hash table. Typical types of hashing functions include truncation, folding, transposition and modulo arithmetic. A major disadvantage of hashing techniques is that more than one key can translate into the same storage address, causing "collisions" in storage and retrieval operations. Some sort of collision-resolution strategy must therefore be provided to find a readily recoverable place to store all of the records hashing to the same address. Moreover, such collided records must themselves be recoverable in a reasonable amount of time so as not to lose all of the increased searching speed gained with the hashing technique.

One well-known storage strategy for rapid retrieval is to form a binary tree structure out of all of the collided data records. The bit positions of the unhashed key value can be used to control the rapid stepping through the binary tree to the desired record without examining any other records in the tree.

It is therefore desirable to utilize a hashing technique for storing and retrieving customer records in a customer billing system and to resolve collisions in the hashing operation by the use a binary tree structure to store customer records hashing to the same address in the hash table. While this approach produces a very fast storage and retrieval system, it may still not be fast enough to accommodate a real-time customer billing system for a large packet transmission network utilizing usage sensitive billing.

SUMMARY OF THE INVENTION

In accordance with the illustrative example of the present invention, the search and retrieval operations in a large storage and retrieval system are dynamically optimized as the search and retrieval operations are carried out. More particularly, the immediate past history of the storage and retrieval operations are examined and a more efficient variant of the storage and retrieval algorithm selected for future use. All of the possible variants in the access algorithm can be investigated and the most efficient one selected. Moreover, if the traffic shows periodic similarities, previously calculated optimum algorithms can be simply selected from a table and used to provide optimal performance.

More specifically, if a hashing technique is used for storage and retrieval, the hashing function can be modified in systematic steps and the number and distribution of the collisions calculated for recently received sets of keys, all without actually storing or retrieving any data. A desirable criterion of optimum hashing is selected and the criteria resulting from the systematic calculations compared to select the optimum. The probability of collisions is one such criterion. If collisions are resolved by a binary search tree, then the average depth of such trees or the value of the standard deviation of the depth distribution are other useful criteria of performance for the hashing system. The hashing function can be modified by selecting different key values from the data to be hashed, or by altering the operation performed on the key value, or both. Modulus arithmetic can, for example, be modified by changing the modulus in regular steps. Folding, transposition and truncation can be undertaken at varying bit positions.

One major feature of the present invention is the ability to recognize periodic data patterns and to associate pre-calculated optimum search algorithms for each such data pattern. The dynamically alterable search algorithm is then no more than looking up the appropriate strategy for the observed pattern. A significant backup, however, is the ability to calculate an optimum strategy on the fly as data arrives, if the data does not conform to any previously calculated pattern.

In the preferred embodiment, the dynamically optimized searching algorithm of the present invention is applied to customer billing records in a usage sensitive data transmission billing system. Other applications will be readily apparent to those skilled in the art.

BRIEF DESCRIPTION OF THE DRAWINGS

A complete understanding of the present invention may be gained by considering the following detailed description in conjunction with the accompanying drawing, in which.

To facilitate reader understanding, identical reference numerals are used to designate elements common to the figures.

DETAILED DESCRIPTION

Figures 1, 2, 3:
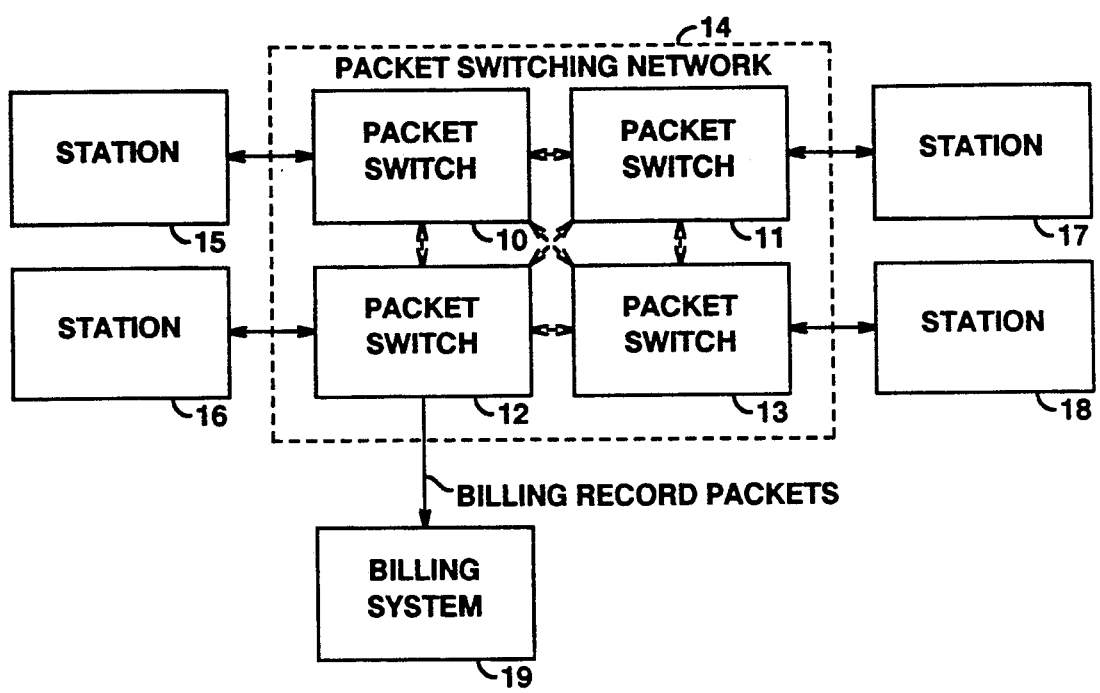
FIG. 1 shows a general block diagram of a data packet network including a billing system in which the dynamically alterable search algorithm of the present invention can be used.
FIG. 2 shows a graphical representation of a typical billing record format generated in the data packet network of FIG. 1.
FIG. 3 shows a graphical representation of a typical customer account record for accumulating the information in the billing records of FIG. 2, used in the billing system of FIG. 1.

Referring more particularly to FIG. 1 of the drawings, there is shown a general block diagram of data packet network. The network comprises a data packet switching network 14 including a plurality 10, 11, 12, . . . 13 of packet switches interconnected together to form a multiroute redundant packet switching mechanism between a much larger plurality of customer stations 15, 16, 17, . . . 18 connected to the switches 10-13. The stations 15-18 launch and receive message packets of data preceded by a header including the address of the destination for that packet. The header typically also includes the address of the source and other supervisory information. The packet switches 10-13 utilize the header address information to route each message packet through the network 14 to the packet switch connected to the destination station. The packet switches 10-13 are typically widely distributed geographically and interconnected by wideband digital transmission facilities to assure rapid delivery of all message packets to the assigned destination. Typically, packet switching networks such as network 14 also have the ability to deliver the same message packets to multiple destinations so that any one of stations 15-18 can "broadcast" a single message to a plurality of destination stations. Also typically, a very large plurality of stations like stations 15-18 are serviced by each one of packet switches 10-13. Such packet transmission networks are well known in the art and will not be further described here.

If the data packet transmission network of FIG. 1 is provided by a common carrier, or if shared use of the network is contemplated, then it is necessary to assign the costs of building and maintaining the network to a plurality of users in some way which is considered fair and reasonable to those users. One such method of assigning costs is called usage sensitive billing. In usage sensitive billing, each user is monitored to determine how much use that user makes of the network, and the user is then billed proportionally to that usage. The normal elements of usage are the number of message packets delivered by the network, the length of those delivered message packets, and the length of the route over which the delivered message packets must travel in order to reach the desired destination. If each of the packet switches of network 14 creates a billing record when packets are delivered, and if that billing record includes the source address, the destination address and a count of the number of packets delivered, then usage sensitive billing records can be constructed from those billing records. The format of a typical billing record is shown in FIG. 2. In FIG. 1, it is assumed that the one of packet switches 10-13 which is connected to the destination station generates the billing record after delivering the message packet to the proper destination. All of these billing records are delivered to a common billing system 19 where usage charges can be accumulated for each of the customers of the network 14. A single billing record, or a plurality of such billing records, can be formatted as a standard message packet and launched on the packet switching network 14 of FIG. 1 with a destination of billing system 19. Alternatively, if the billing message packets might overload the capacity of the switching network 14, these billing records can be delivered to billing system 19 by separate dedicated transmission facilities. In any event, a very large number of billing records are delivered to billing system 19, which records must be processed in real time without loss of any records. Techniques for the rapid processing of large numbers of records in real time is the subject matter of this invention.

Figure 4:
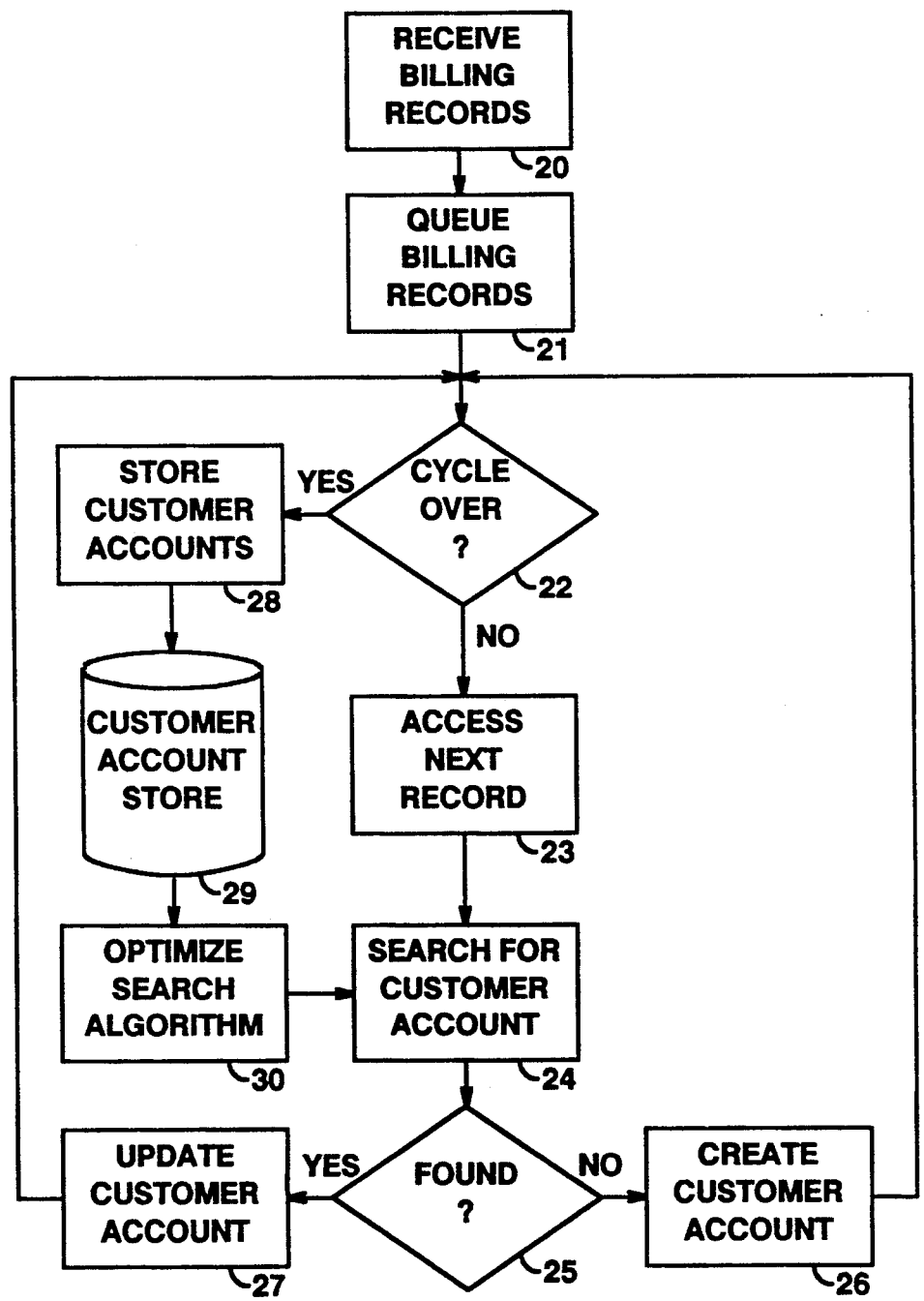
FIG. 4 shows a general flow chart for a billing procedure using the dynamic optimization technique of the present invention.

Referring next to FIG. 4, there is shown a general flow chart of the billing procedure which takes place in the billing system 19 of FIG. 1. In box 20 of FIG. 4, large numbers of billing records such as that shown in FIG. 2 are received from the data packet network of FIG. 1. In box 21 these billing records are queued to assure processing of received records in the order they are received and to provide some time buffering of the billing records if such records arrive faster than they can be processed. Typically, billing takes place in billing cycles which can be as long or as short as is desired, but which are adjusted to optimize the billing process. In one data packet transmission system, the billing cycle is on the order of thirty minutes. Billing cycles typically do not span more than one billing rate interval. In decision box 22, it is determined whether or not the current billing cycle is over. If the current billing cycle is over, box 28 is entered where the currently processed customer accounts are stored in a customer account store 29. Store 29 provides a long term storage facility for customer account records. Such records typically take the form shown in FIG. 3, and include the source and destination of message packets, which together uniquely identify a customer, and the accumulated packet count for a billing cycle for messages sent between that source address and that destination address. The detailed message accounting thus provided to the customer allows the customer to control the use of the network in accordance with the customer's needs.

If the current billing cycle is not over, as determined in decision box 22, box 23 is entered where the next billing record is accessed from the queue generated in box 21. This record is examined to determined the source and destination addresses since these addresses are assigned to particular customers. Using this address information, the appropriate customer account is searched for in box 24. In decision box 25, it is determined whether or not the customer account record is found. If not, box 26 is entered in which a customer account record (like that shown in FIG. 3) is created, along with the appropriate charge units and box 22 is re-entered. If the customer record is found, as determined by box 25, box 27 is entered to update the accumulated charge units for that customer record. Then box 22 is re-entered to get the next billing record from the queue.

The most time consuming activity of the billing procedure of FIG. 4 is the search for customer accounts in box 24. Since there may well be tens of thousands of customer accounts, the necessity to search such a large data base for each billing record processed is the major bottleneck in providing real-time, on line billing procedures. In accordance with the present invention, box 30 provides optimization of the search algorithm used by box 24, depending on the performance of the algorithm during past billing cycles. This strategy is based on the premise that past billing activity is a good predictor of future billing activity. The billing cycle can, of course, be reduced in length until this premise is substantially true. How the analysis of past activity is accomplished and how this analysis is used to alter the search algorithm will be discussed hereinafter.

Figures 5, 6:
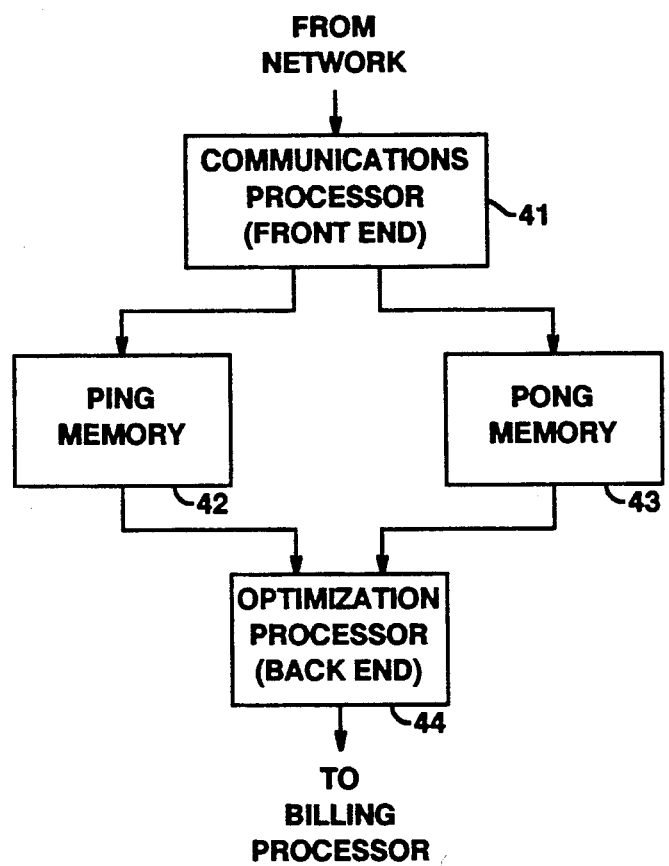
FIG. 5 shows a general block diagram of a ping-pong queue which is useful in carrying out the billing procedure of FIG. 4.
FIG. 6 shows a graphical representation of a typical station address in a data packet network such as that shown in FIG. 1.

Referring next to FIG. 5, there is shown one convenient way in which the queuing process of box 21 can be accommodated and, at the same time, accommodate the processing necessary to provide optimization of the search algorithm in box 30. In FIG. 5, billing records received from the network of FIG. 1 are processed by a front end communications processor 41. Processor 41 unpacks billing records from data packets, demodulates signals and performs all other transmission protocols necessary to deliver billing records, one at a time, to one or the other of memories 42 and 43. Memories 42 and 43 are operated in the so-called "ping-pong" mode. That is, memory 42 acts as a queue for received billing records until either memory 42 is full, or until the billing cycle is over. At that time, processor 41 switches over to memory 43 and begins to queue billing records in memory 43. At the same time, a rear end processor 44 begins to deliver billing records from memory 42 to the billing system of FIG. 4. The two memories 42 and 43 thus operate alternately, filling one memory while the other memory is being emptied. In this process, the back end processor 44 has very little to do since the billing messages are already formatted properly by front end processor 41. Processor 44 therefore need only deliver such billing records, one at a time, to the balance of the billing system shown in FIG. 4. In accordance with one feature of the present invention, the available processing time of rear end processor 44 can advantageously be used to perform the search optimization analysis described in connection with box 30 of FIG. 4. Moreover, this processing can take place on the contents of the most recently fully loaded one of memories 42 or 43. The optimization processing can therefore be applied to the most recently received billing data without providing separate storage facilities dedicated to that purpose, and, at the same time, fully utilize the capabilities of rear end processor 44.

For the purposes of illustration, the dynamically optimized searching procedure suggested in FIGS. 4 and 5 will now be discussed in connection with a particular storage and retrieval technique known as hashing. In a hashing system, a portion of the data record, known as the key, is operated upon by an arithmetic and/or logical operation, called the hashing function, to produce an address in the assigned storage space, called the hash table. This storage address is then used directly to access the identified storage location for storing or retrieving a record. Since more than one key can hash to the same storage address, the "collisions" which result are handled by creating a binary search tree with its root at the hash address. Such a search tree uses the binary bits of the key itself to "walk" down the search tree to the actual location at which the record is stored. The hash table, and the binary search trees, can contain the records themselves, or can contain pointer addresses to the location of the data records.

In a hashing system, the hashing function is designed to translate the universe of key values into storage addresses more or less uniformly distributed throughout the hash table. The fewer collisions which occur, the more efficient the data can be stored and retrieved. Hashing functions typically include such operations as truncation, folding, transposition and modulo arithmetic. One of the simplest hashing functions, and hence one most rapidly applied to the keys, is modulo division, where the divisor is the size of the hash table and the remainder is the hash table address. For the purposes of simplicity, modulo division will be used in the illustrative example although it is clear that any other hashing function can also be used.

It is also necessary to select the key to be hashed from the data records. As shown in FIG. 2, the billing records include both a source address and a destination address. Each of these addresses have the station address format shown in FIG. 6. These addresses are typically in binary-coded-decimal (BCD) format and comprise five country digits, three area code digits, three central office code digits, four station code digits and one BCD digit which is unused. Clearly, the four station code digits are most likely to produce hash addresses with a higher probability of uniform distribution over the hash table. These four BCD digits are made up of sixteen binary bits. Since both a source address and a destination address are available, two station codes are available in the billing record of FIG. 6, and hence thirty-two binary digits. While thirty-two binary bits of BCD information give rise to $10^8$ possible addresses (due to the BCD format), only a small subset of these addresses will actually be used for customers. If k is taken as the key, S the size of each customer record and M the size of the hash table, then the hashing function can take the form:

$$h(k) = (k \bmod M)*S + \text{BaseAddress} \quad (1)$$

where BaseAddress is the address of the start of the hash table. This hash function can be executed on a typical computer in an amount of time almost negligible in comparison to the dequeuing time and time required to update a record (FIG. 4).

Assuming that the ping-pong queuing system of FIG. 5 is used in the billing procedure of FIG. 4, one of the memories, memory 42 for example is loaded with billing records. When memory 42 is full or the billing cycle terminates, processor 41 starts queuing billing records in memory 43. Since processor 44 is capable of dequeuing the records in memory 42 in only a small percentage of the available time, processor 44 is free to analyze the records in memory 42 to determine an optimum hashing function. If it is assumed that the modulus of equation (1) can be changed (between limits) and that the binary bits of the source and destination station addresses can be selectively masked to produce a range of hash keys, then these variables can be altered systematically by processor 44 and a resulting figure of merit evaluated for all of the possibilities. It is therefore only necessary to select the combination of variables in the hashing function which produces the "best" result. The criterion of "best" result is dependent on the number of collisions and hence can be approximated by dividing the size of the hash table (MOD) by the number of different hash addresses generated by the hashing function. Other optimization functions are possible. A flow chart implementing this optimization process is shown in FIG. 7 and pseudocode for implementing the optimization procedure shown in the APPENDIX.

Figure 7:
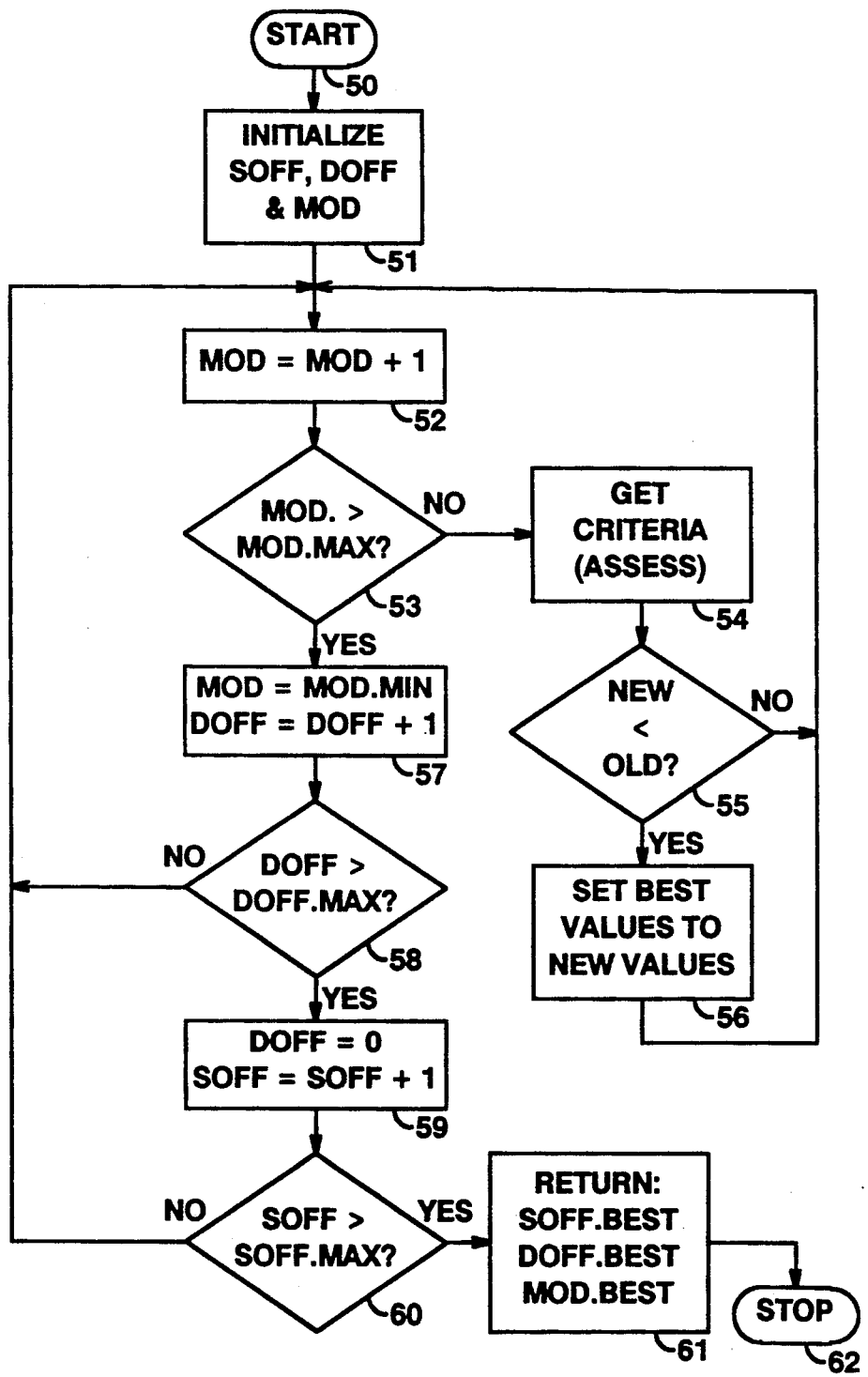
FIG. 7 show a flow chart of a procedure for optimizing a hashing function in accordance with the present invention.

In FIG. 7 there is shown a flow chart for optimizing the hash function of equation (1), assuming that the modulus MOD can be varied and that the digits of the source and destination addresses can be selected to form the hash key. If a fixed number of binary bits of each address, four for example, are combined to form the hash key, then a source address offset (SOFF) and a destination address offset (DOFF) can be used to specify, and vary, the hash key. With these assumptions, the optimization procedure of FIG. 7 starts at start box 50 and proceeds to box 51 where the variables MOD, SOFF and DOFF are initialized to starting values which can be incremented throughout the range of possible values. The offsets, for example, can be initialized at zero while the modules can be initialized at some minimum value less than the maximum possible value (MOD.MAX).

Leaving initialization box 51, box 52 is entered where the modulus is incremented by one. Decision box 53 is then entered to test whether the modulus is greater than the maximum permissible modulus MOD.MAX. If MOD.MAX has not been exceeded, box 54 is entered where a routine called ASSESS is called to evaluate the criterion of performance for the current values of MOD, SOFF and DOFF. This assessing procedure will be described in detail in connection with FIG. 8. The criterion returned from box 54 is compared, in decision box 55 with the previously stored best value for the criteria. If the new criterion is better than the previously stored best criterion, then box 56 is entered where the new values are substituted for the previous best values. Box 52 is then re-entered to increment the modulus by one and repeat the assessment procedure of boxes 54, 55 and 56. If the new values from box 54 are not better than the previously stored values, decision box 55 causes box 52 to be entered directly to evaluate a new modulus value.

When the entire range of possible modulus values is exhausted, decision box 53 directs the logic flow to box 57 where the modulus is reset to the initialization value MOD.MIN and the destination address offset DOFF is incremented by one. In decision box 58, the value of DOFF is tested to see if it exceeds the maximum permissible value DOFF.MAX. If not, box 52 is re-entered to cycle through the modulus values for the new value of DOFF. When the permissible values of DOFF have been exceeded, box 59 is entered to reset DOFF to zero and increment the value of SOFF by one. Decision box 60 is then entered to determine if the permissible values of SOFF have been exceeded. If not, box 52 is re-entered to cycle through the permissible values of MOD and the permissible values of DOFF for the new value of SOFF. When all of the permissible values of SOFF have been exhausted, box 61 is entered to return the best values of MOD, DOFF and SOFF to the calling program. The procedure terminates in terminal box 62.

It can be seen that the optimization procedure of FIG. 7 systematically examines all of the possible combinations of hashing parameters applied to all of the most recently received billing records. The "best" combination of hashing parameters (MOD, DOFF and SOFF) is then returned to be used by the hashing procedure in search box 24 of FIG. 4 to hash the next set of billing records. It is therefore assumed that the most recent distribution of hashed addresses is likely to persist into the next billing cycle (FIG. 4) or into the next queuing cycle (FIG. 5). If, of course, it is found that the data packet traffic is highly periodical, it is possible to store the optimum hashing parameters for each predictable traffic period and to access and use these pre-stored parameters without calculations. It may be desirable, however, to continue the predication calculations even while using pre-calculated parameters to ensure that the predicted traffic pattern is not substantially disturbed by unforseen circumstances such as natural disasters and economic events.

Figure 8:
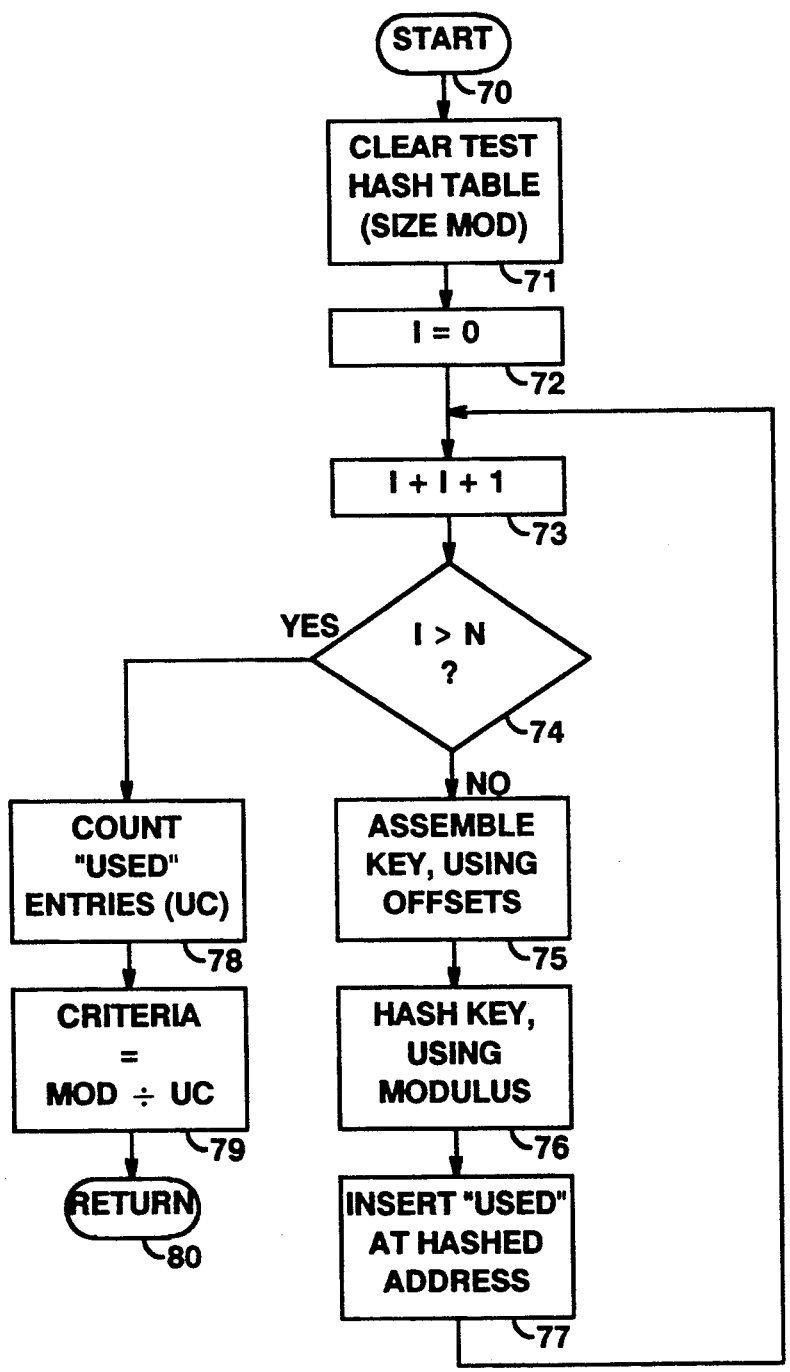
FIG. 8 shows a flow chart for assessing the hashing parameters used in the optimization procedure of FIG. 7.

In FIG. 8 there is shown a flow chart of a hashing parameter evaluation or assessment process for use in box 54 of FIG. 7. Starting at start box 70, box 71 is entered to clear a storage space for a test hash table corresponding in size to all of the possible hashed addresses, i.e., equal to MOD, where the value of MOD is passed to the routine of FIG. 8 by the procedure of FIG. 7. In box 72 an index I is initialized at zero and, in box 73, the index I is incremented by one. In decision box 74, it is determined if the index I has exceeded the number N of billing records to be hashed. If not, box 75 is entered where a hash key is assembled using the values of the source address offset SOFF and the destination address DOFF, also passed to the routine of FIG.

8 by the routine of FIG. 7. In box 76, the assembled hash key and the modulus value are inserted into equation (1) and assigned to the current billing record to generate an address in the hash table. In box 77, an indication of the selection of this address is stored in the test hash table, e.g., store the word "USED." Box 73 is then re-entered to increment the index I by one and to re-enter the hashing loop 74-77 for the next billing record to be hashed. When all N of the billing records have been exhausted, decision box 74 detects this fact and box 78 is entered where the number UC of "USED" entries in the test hash table are counted. In box 79 the hashing criteria is evaluated. One simple criterion is the average depth of the binary search trees, given by the number of records hashed divided by the number of different table addresses generated. The "best" possible value, the minimum value, of the quotient is "1." The lower this value is, the more efficient is the hashing procedure. This value is returned to the calling program in FIG. 7 in return box 80.

It is clear that other hashing functions than that of equation (1), other variable hashing parameters and other evaluation criteria can be used in the dynamic optimization procedure of the present invention. For example, only one of the addresses, the source or the destination address, can be used to form the hash key. Indeed, one or the other can be selected to form the hash key depending on which address has the larger number of distinct address values. In that case, a single offset which can range all the way through both the source and the destination addresses can be used, its value adjusted to select the appropriate one of these addresses. Other variations will be readily apparent from the above discussion.

It should also be clear to those skilled in the art that further embodiments of the present invention may be made by those skilled in the art without departing from the teachings of the present invention.

APPENDIX

Dynamic Hashing Algorithm
    Definitions
  criteria     = Numerical Criteria of Hashing Performance
               = Average Binary Search Tree Size
  criteria.min  = Smallest Acceptable Value for criteria
  keya       = Contiguous Subset of Digits of Source Address
               (16 bits)
  keyb       = Contiguous Subset of Digits of Destination Address
               (16 bits)
  soff        = Offset of key.a from beginning of Source Address
  doff        = Offset of key.b from beginning of Destination Address
  mod        = Base for Modulo Arithmetic = Size of Hash Table
  mod.max    = Largest Memory Space Available for Hash Table
  range     = Maximum Number of Key Offsets Which Can be
               Processed in the Time Available
          Dynamic Hashing Pseudocode
procedure.dynhash
       /* Initialize */
       criteria = 0
       soff = default.soff
       doff = default.doff
       mod = default.mod /* = Largest Prime < mod.max */
       /* Main Procedure */
       while (one memory is being loaded)
          hash all records in memory (soff, doff, mod)
          criteria = assess(soff, doff, mod)
       endwhile
       while (other memory is being loaded)
          if criteria < criteria.min
          /* Optimize Hash Function */
             criteria.best = infinity fR
             for soff = 0→soff.max
               for doffset = 0→doff.max -continued
APPENDIX for mod = (mod.max - range)→mod.max
                 criteria = asses(soff, doff, mod)
                 if criteria < criteria.best
                    criteria.best = criteria
                    soff.best = soffset
                    doff.best = doffset
                    mod.best = mod
                 endif
               endfor
             endfor
             endfor
          endif
          sreturn = soff.best
          dreturn = doff.best
          mreturn = mod.best
       endwhile
       return(sreturn, dreturn, mreturn)
end_procedure
       /* Assess Performance Pseudocode */
procedure.assess(soff, doff, mod, key.array[])
       Definitions
       criteria = Average Binary Search Tree Size
       key.array = Array of 32-Bit Hash Keys
       hash.table = array of size mod
       /* Main Procedure */
       for i = 1→mod
          hash.table[i] = "UNUSED"
       endfor
       for j = 1→n /* n = Key Array Size */
          skey = source_address(soffset)
          dkey = destination_address(doffset)
          key = "skeydkey"
          address = key(mod mod)
          hash_table[address] = "USED"
       endfor
       number_USED = count(USED, hash.table[])
       criteria = n / number_USED
       return(criteria)

What is claimed is:

1. A billing system for data packet transmission systems comprising
    means for generating billing records reflecting the customer traffic through said packet transmission systems, said billing records each including a source address, a destination address and a packet count,
    means for queuing said billing records in the order received at a billing location,
    means for accessing said billing records, one at a time,
    means responsive to the contents of accessed ones of said billing records for searching for a matching customer account record to be updated by the contents of said billing record, said searching means comprising means for hashing at least some portion of said source and destination addresses to access said customer account records and said means for hashing including modulo arithmetic means for operating on said source and destination addresses and means for varying the modulus used by said modulo arithmetic means in order to optimize the customer account record access, and
    means responsive to previously received billing records for optimizing the operation of said searching means.

2. The billing system according to claim 1 further comprising
    means for selectively altering the portions of said source and destination addresses used to access said customer account records.

3. The billing system according to claim 1 further comprising a pair of billing record queues used alternately to queue said billing records, and means for analyzing the contents of one of said queues while the other one of said queues is delivering billing records to said searching means in order to determine optimum parameters for controlling said searching means.

4. A method for processing billing records for a data packet transmission system, said method comprising the steps of generating billing records reflecting the customer traffic through said packet transmission system, said billing records each including a source address, a destination address and a packet count, queuing said billing records in the order received at a billing location, accessing said billing records, one at a time, searching, in response to the contents of accessed ones of said billing records, for a matching customer account record to be updated by the contents of said billing records, said searching step comprising hashing at least some portion of said source and destination addresses in order to access said customer account records and said hashing step comprising operating on said source and destination addresses using modulo arithmetic operations and varying the modulus used in said modulo arithmetic operation in order to optimize the customer account record access, and optimizing, in response to previously received billing records, the operation of said searching step.

5. The method according to claim 4 further comprising the step of selectively altering the portions of said source and destination addresses used to access said customer account records.

6. The billing system according to claim 4 further comprising alternately queuing said billing records in a pair of billing record queues, and analyzing the contents of one of said queues while the other one of said queues is in use in order to determine optimum parameters for controlling said step of searching.

* * * * *